(12) United States Patent
Ogino et al.

(10) Patent No.: US 7,158,799 B2
(45) Date of Patent: Jan. 2, 2007

(54) WIRELESS BASE STATION POSITION SETTING METHOD, WIRELESS COMMUNICATION SYSTEM, AND PROGRAM

(75) Inventors: Atsushi Ogino, Kodaira (JP); Takeshi Kato, Akishima (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 11/003,483

(22) Filed: Dec. 6, 2004

(65) Prior Publication Data
US 2005/0186972 A1    Aug. 25, 2005

(30) Foreign Application Priority Data
Dec. 18, 2003   (JP) ............................. 2003-420521

(51) Int. Cl.
*H04Q 7/20* (2006.01)
(52) U.S. Cl. ..................... 455/457; 455/435.1
(58) Field of Classification Search ............. 455/414.1, 455/414.2, 404.1, 404.2, 424
See application file for complete search history.

(56) References Cited

U.S. PATENT DOCUMENTS 5,570,412 A * 10/1996 LeBlanc ................. 455/456.2
6,236,938 B1 * 5/2001 Atkinson et al. ........... 701/214
2005/0213155 A1 * 9/2005 Ciccarelli .................. 358/1.18
2006/0071783 A1 * 4/2006 Culpepper et al. ...... 340/539.13

FOREIGN PATENT DOCUMENTS

JP      07-181242     12/1993

OTHER PUBLICATIONS

A. Ogino et al., "Integrated wireless LAN Access System—Study on Location System", 2003 IEEE General Meeting, pp. 662, with 4 pages of English translation.

* cited by examiner

*Primary Examiner*—Duc M. Nguyen
*Assistant Examiner*—Justin Lee
(74) *Attorney, Agent, or Firm*—Reed Smith LLP; Stanley P. Fisher, Esq.; Juan Carlos A. Marquez, Esq.

(57) ABSTRACT

To efficiently obtain and register the position of a base station in a database. A map or a drawing, such as a plan of a building, is read and displayed on display unit (114). Then, on the basis of the real coordinates of a first reference position P0 on the display unit and a real distance per a unit of display, the real coordinates of a second reference position P1 set on the display unit (114) are obtained. Then, on the basis of the real coordinates of the second reference position and an offset from the second reference position to the base station (140), the real coordinates indicating the position P2 where the base station is located are obtained, and these real coordinates indicating the position P2 are registered in the database.

15 Claims, 6 Drawing Sheets

FIG.2

```
START
  ↓
LOAD A MAP FILE AND DISPLAY THE MAP — S210
  ↓
INPUT A FIRST REFERENCE POINT AND SCALE RATIO — S220
  ↓
INPUT A BASE STATION ID, A SECOND
REFERENCE POINT AND ITS OFFSET — S230
  ↓
CALCULATE THE BASE STATION COORDINATES — S240
  ↓
REGISTER THE BASE STATION ID AND
ITS COORDINATES IN A DATABASE — S250
  ↓
END
```

FIG.3

| BASE STATION ID (NETWORK ADDRESS) | BASE STATION POSITION (x,y,z) |
|---|---|
| 00:1A:2B:3C:4D:5E | 0.00,12.00,23.23 |
| | |

WIRELESS BASE STATION POSITION SETTING METHOD, WIRELESS COMMUNICATION SYSTEM, AND PROGRAM

CLAIM OF PRIORITY

The present application claims priority from Japanese application P2003-420521 filed on Dec. 18, 2003, the content of which is hereby incorporated by reference into this application.

BACKGROUND

This invention relates to a wireless communication system that detects the position of a terminal using a radio signal, and particularly to the setting of the position of a base station.

A method of detecting the position of wireless terminals in a cellular telephone system is suggested which calculates time differences between receptions of signals transmitted from base stations at known positions to a wireless terminal (signal propagation time differences from the base stations to the wireless terminal: T1–T2 and T3–T2) and multiplies the propagation time differences by the velocity of light to obtain differences between signal propagation distances from the wireless terminal to the base stations, i.e. D1–D2=c(T1–T2) and D3–D2=c(T3–T2), so as to detect the position of the wireless terminal (e.g., see JP 07-181242 A).

Also, a method of detecting the position of terminals in a wireless LAN system is suggested which calculates time differences between receptions of a signal transmitted from a terminal to base stations at known positions (reception time differences between base stations: Ti–T1) and multiplies the reception time differences by the velocity of light to obtain signal propagation distance differences from the terminal to the base stations: {|P–Pi|–|P–P1|}=c(Ti–T1), i=2, . . . , n, so as to detect the position of the terminal (e.g., see Atsushi Ogino et al., "Wireless LAN Integrated Access System (1) Study on Position Detecting System", Proceedings of the 2003 IEICE General Conference, B-5-203, p. 662 (IEICE: The Institute of Electronics, Information and Communication Engineers).

SUMMARY

This wireless LAN system provides a plurality of base stations as references to precisely specify the position of terminals.

In a system which measures the position of terminals using timing of reception of signals transmitted/received between base stations and terminals, like the wireless LAN system mentioned above, since the positions of terminals are specified on the basis of the positions of base stations, accurately measuring the positions of terminals requires precise information about the "known" positions of base stations.

The positions where base stations are located are manually measured and the measured results are entered in a database etc. However, manually performing all processes of the measurement of a base station and the entry of measured data requires a large number of work steps and great efforts to set the position of the base station. Furthermore, performing the measurement and data entry through a sequence of manual work steps leads to an increased number of errors and mistakes, causing the position of the base station to be set less accurately.

Especially, when a base station is installed within a building, walls and various equipment present between a predetermined reference position and the base station may hinder direct measurement of the base station position from the reference position, and then the measurement must be made in a plurality of sections. This tends to cause large measuring errors and requires increased efforts for the measurement.

This invention has been made in view of the problems mentioned above, and an object of this invention is to efficiently obtain and register the position of a base station.

According to this invention, a map or a drawing, such as a plan of a building, is read and displayed on display unit. Then, on the basis of the real coordinates of a first reference position on the display unit and a real distance per a unit of display (or a pixel), the real coordinates of a second reference position set on the display unit are obtained. Then, on the basis of the obtained real coordinates of the second reference position and an offset from the second reference position to the base station, the real coordinates indicating the position where the base station is located are obtained, and these real coordinates indicating the position are registered in a database.

Thus, according to this invention, what is actually measured is the offset from the second reference position to the position of the base station, and so the measurement requires less efforts. Also, this invention removes the need for manual entry into the database and thus reduces work load, thereby reducing the required number of work steps and lessening occurrence of mistakes during work. It is therefore possible to efficiently and accurately obtain and register the position of the base station. Accurately obtaining the position of the base station offers enhanced accuracy during measurement of the position of a terminal that is performed on the basis of the position of the base station.

BRIEF DESCRIPTION OF THE DRAWINGS

FIG. 2 is a flowchart of an example of a process performed by a computer to set the position of a base station according to the embodiment of this invention.

FIG. 3 is an explanatory diagram illustrating contents registered in a database according to the embodiment of this invention.

DETAILED DESCRIPTION OF THE PREFERRED EMBODIMENTS

One embodiment of this invention is now described referring to the accompanying drawings.

Figure 1:
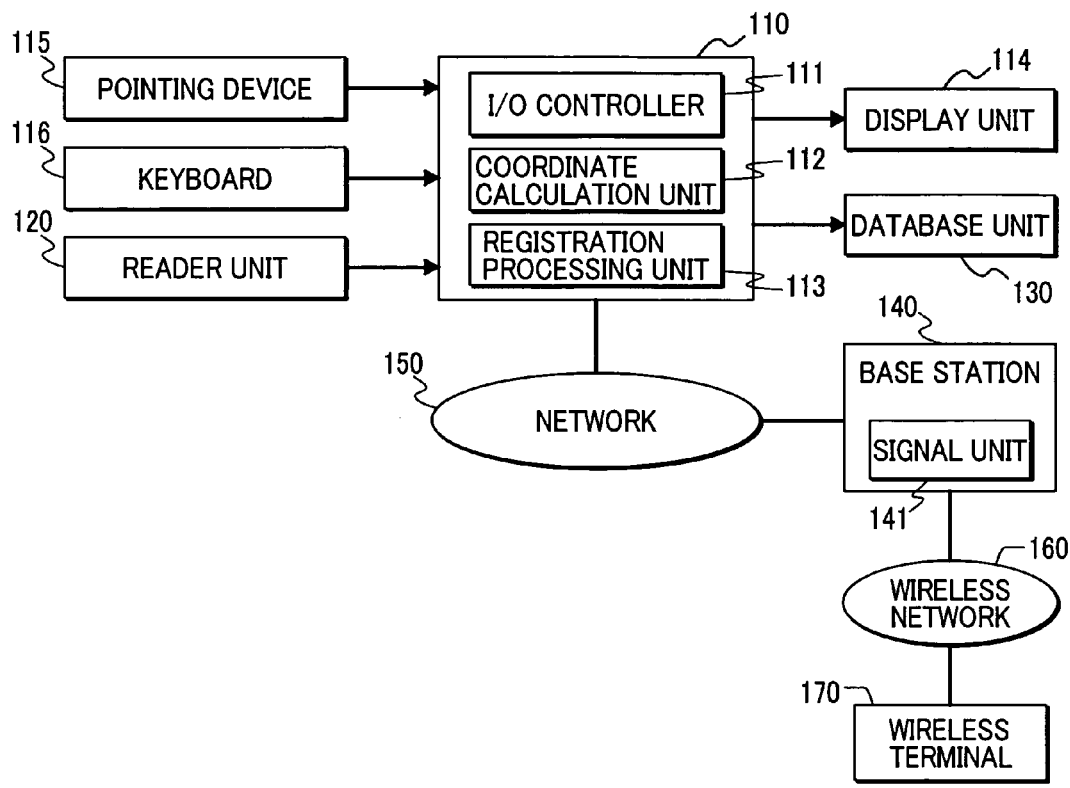
FIG. 1 is s a block diagram of a system illustrating an embodiment of this invention.

FIG. 1 is a block diagram showing the configuration of a system for setting the position of a base station according to a first embodiment of this invention.

A network 150, e.g. a LAN, is connected with a base station (or a wireless LAN base station, an access point) 140 and a computer 110. The base station 140 performs wireless communications with a wireless terminal 170 and also measures the position of the terminal. The computer 110 measures the position of the wireless terminal 170 as described with the related arts, on the basis of a time difference of reception at the base station 140 of a signal sent from the terminal.

The computer 110 thus has a function as a server measuring the position of the wireless terminal 170 and a function of setting the position of the base station and registering the position in a predetermined database. The function of setting and registering the position of the base station 140 is now described below, while the terminal position measuring function is not described here since it is done as described with the related arts.

The computer 110 is connected with input devices including a pointing device 115, a mouse or a tablet, for specifying coordinates etc., a keyboard 116 for entering numerical values etc., and a reader unit 120 for reading image information such as maps and plans. The reader unit 120 can be a scanner when maps or plans (drawings) are presented as printed matter. When maps and plans are presented as data files, the reader unit 120 can be means (e.g. an optical disk drive) for reading the medium storing the data files. The reader unit 120 can thus be properly chosen depending on how the image information is presented.

The computer 110 is connected also with display unit 114 for displaying image information and a database unit 130 for storing the position, address, etc. of the base station 140.

Also, the computer 110 includes an input/output controller 111 for displaying image information etc. on the display unit 114 on the basis of inputs from the input devices, a coordinate calculating unit 112 for, as will be described later, calculating the coordinates of the position of the base station 140 on the basis of the read image information, commands from the pointing device 115, and inputs from the keyboard 116, and a registration processing unit 113 for registering in the database unit 130 the calculated coordinates and the address of the base station 140 (a unique identifier uniquely identifiable on the network 150, such as MAC address).

As will be described later, the base station 140, connected to the network 150 or the wireless network 160, has a signal unit 141 (signaling means) that provides a sign (e.g. light or sound output) to signal its existence to an operator or a manager, as commanded by the computer 110.

Next, FIG. 2 is a flowchart showing an example of a process performed by the computer 110 to set the position of the base station 140.

First, in a step S210, the reader unit 120 reads a map (load a map file) or a plan of a building including the position of the base station 140 and the display unit 114 displays the map. For example, as shown in FIG. 5B, a map or a plan of the building is displayed on the display unit 114 as image information having an orthogonal coordinate system with X, Y, and Z axes (see FIG. 5A).

Next, a step S220 sets the scale ratio of the image information displayed on the display unit 114 and also sets, with the pointing device 115, a first reference position P0 for measuring the position of the base station 140, on the screen of the display unit 114. For example, the scale ratio is a value represented by a ratio between a distance between pixels (dot pitch) on the display unit 114 and the real distance on the drawing.

Figure 5A:
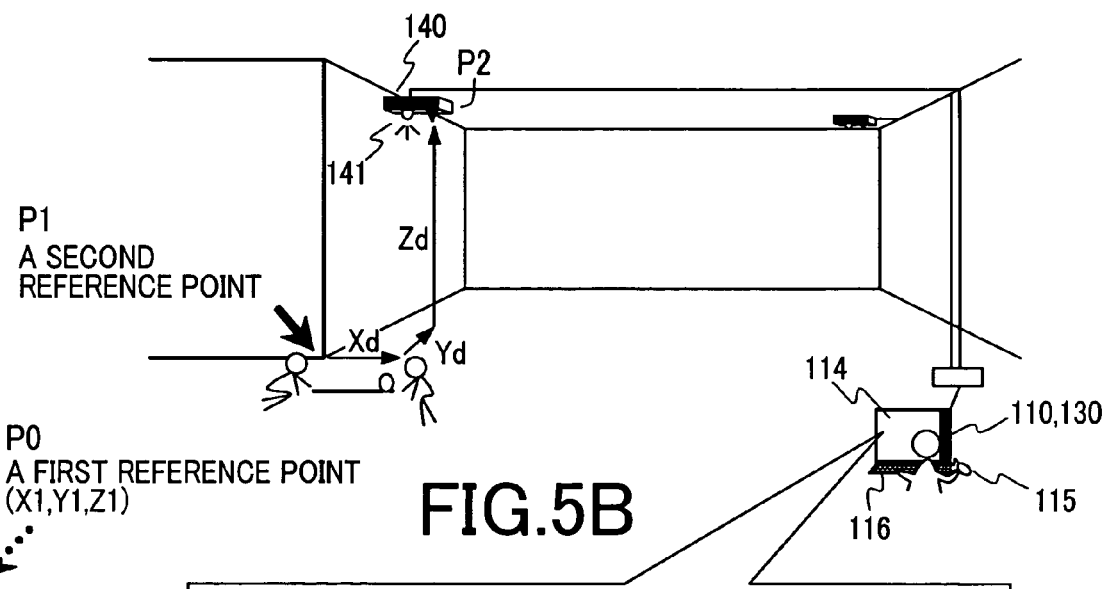
FIG. 5A is a perspective view illustrating how measurement is performed and how a second reference position P1 is located with respect to the position of a base station according to the embodiment of this invention.
Figure 5B:
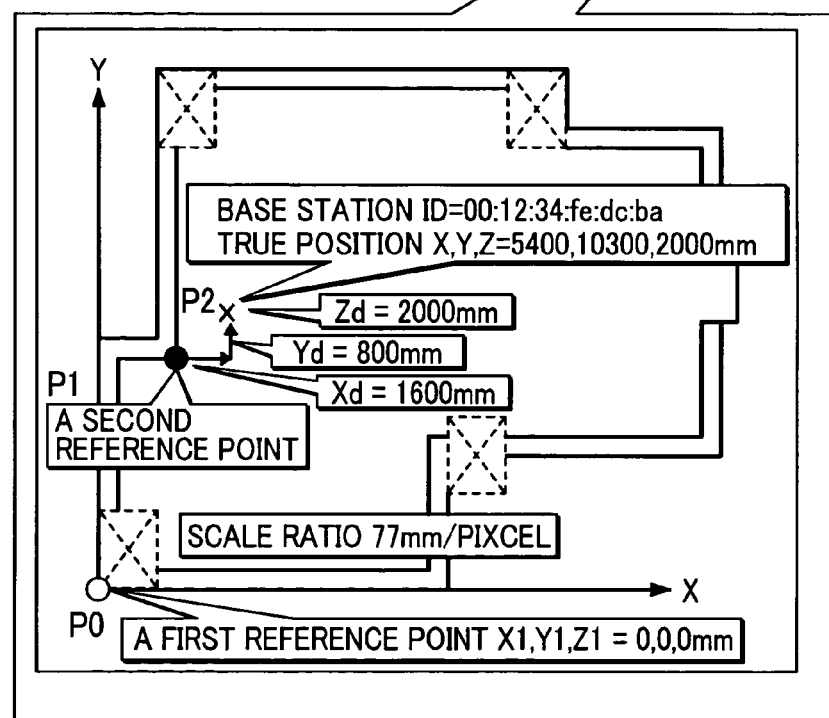
FIG. 5B shows an image displayed on display unit 114, which illustrates how the measurement is performed and how the base station, the second reference position P1, and the first reference position P0 are located with respect to each other according to the embodiment of this invention.

For instance, in FIG. 5B, the scale ratio of the displayed image information is set at 77 mm/pixel and a corner of the lower left pillar in the plan of the building is set as the first reference position P0 (the coordinate origin), where the coordinates of the first reference position P0 are set as (X1, Y1, Z1)=(0, 0, 0) [mm]. Note that Z1=0 [mm] represents the floor surface. The scale ratio can be properly changed depending on the scale of the read drawing and the resolution, display size, etc. of the display unit 114. The coordinate system is not limited to an orthogonal coordinate system but can be any coordinate system.

The first reference position P0 can be positioned at any point settable on the display unit 114 and there is no need for actual measurement.

Next, in a step S230, a second reference position P1 is set with the pointing device 115 on the display unit 114. The second reference position P1 is positioned at a point where actual measurement (gauging) is possible in the vicinity of the installed base station 140. When the second reference position P1 is thus determined, the amounts of offset from the second reference position P1 to the actual position P2 of the base station 140 (see FIG. 5B) are measured and the measured results are entered, e.g. from the keyboard 116. Then the address or unique identifier (ID) previously assigned to this base station 140 is entered.

Now, as shown in FIG. 5A, the offset of the position P2 of the base station 140 is measured on the basis of the point at which the perpendicular line from a reference point of the base station 140 attached on the ceiling (e.g. the position of an antenna 146 shown in FIG. 6) meets the floor surface. The measured amounts of offset include an X-coordinate offset Xd and a Y-coordinate offset Yd from the second reference position P1 set at a corner near the base station 140 and a Z-coordinate offset Zd (from the floor surface to the reference point (e.g. the antenna) of the base station 140). Then the measured amounts of offset (Xd, Yd, Zd) of the position P2, or relative coordinates from the second reference position P1, are entered.

Next, in a step S240, on the basis of the scale ratio and the first reference position P0 and the second reference position P1 set on the display unit 114, the coordinates (real coordinates) of the second reference position P1 with respect to the first reference position P0 are obtained, and the measured amounts of offset of the base station 140 from the second reference position P1 are added to these coordinates, so as to obtain the coordinates p_real of the position P2 of the base station 140. The coordinates p_real of the position P2 are (x_real, y_real, z_real), which are calculated according to the determinant below:

$$p\_real = A(p2\_disp - p1\_disp) + p1\_real + pd\_real \quad \text{[Equation 1]}$$

where, A: a matrix representing the scale ratio, p1_disp: the first reference position P0=(x1_disp, y1_disp, 0), p2_disp: the second reference position P1=(x2_disp, y2_disp, 0), p1_real: the absolute coordinates of the first reference position=(x1_real, y1_real, z1_real)=(0, 0, 0), and pd_real: the amounts of offset=(xd_real, yd_real, zd_real).

Accordingly, the determinant above is represented as below:

$$\begin{pmatrix} x\_real \\ y\_real \\ z\_real \end{pmatrix} = r \begin{pmatrix} 1 & 0 & 0 \\ 0 & 1 & 0 \\ 0 & 0 & 1 \end{pmatrix} \begin{pmatrix} x2\_disp - x1\_disp \\ y2\_disp - y1\_disp \\ 0 \end{pmatrix} + \begin{pmatrix} x1\_real \\ y1\_real \\ z1\_real \end{pmatrix} + \begin{pmatrix} xd\_real \\ yd\_real \\ zd\_real \end{pmatrix}$$

[Equation 2]

where r represents the scale ratio.

Next, in a step S250, the coordinates p_real of the position P2 of the base station 140 obtained in the step S240 and the address of the base station 140 set in the step S230 are registered as a set of data in the database unit 130.

FIG. 3 shows an example of contents registered in the database unit 130, which adopts MAC address as the ID (base station identifier) unique to the base station 140. The MAC address and the coordinates of the position P2 (base station position) are thus stored as a set of data.

As described so far, the position setting system of this invention reads a plan of a building, a map, etc. into the computer 110, displays image information representing the space where the base station 140 is installed, and sets the first reference position P0 on the image as a reference in that space. The system also sets the scale ratio of the read image information.

Then, in the vicinity of the position P2 where the base station 140 is actually installed, a position that can be measured from the base station 140 is set on the display unit 114 as the second reference position P1. Subsequently, the amounts of offset from the second reference position P1 to the actual position P2 of the base station 140 (relative coordinates from the second reference position P1) are measured and the measured results are entered into the position setting system. Then, according to Equation 1 or 2, the coordinates of the position P2 of the base station 140 can be obtained from the scale ratio r of the image information and the coordinates of the second reference position P1 plus the amounts of offset.

Thus, the actual measurement is made only from the second reference position P1 determined on the display unit 114 to the position P2 of the base station 140. This greatly reduces the number of work steps as compared with totally manual measurement as mentioned about the related arts, which allows efficient acquisition of the position of the base station. For example, when the base station 140 is installed near a corner of a wall as shown in FIGS. 5A and 5B, the second reference position (the second reference point in the drawing) P1 is set at the point where the wall corner meets the floor surface, on the display unit 114 of the computer 110. Then the distances (amounts of offset) from the second reference position P1 to the base station 140 are measured respectively along the predetermined coordinate axes X, Y, and Z, and the measured results are entered as Xd, Yd, and Zd into the computer 110.

Thus, by an arithmetic operation using the coordinates of the first reference position P0, the scale ratio of the image information, the second reference position P1 set on the display unit 114, and the input amounts of offset, the position setting system running on the computer 110 adds the coordinates of the first reference position P0 to the relative coordinates of the second reference position P1 and the first reference position P0, so as to obtain the second reference position P1, and adds the amounts of offset to the absolute coordinates (real coordinates) of the second reference position P1 so as to determine the absolute coordinates of the base station 140. The positional reference for the measurement of the base station 140 can be previously located at an arbitrary position, e.g. at the position where the antenna 146 is attached.

Also, the second reference position P1 from which the amounts of offset are measured can be arbitrarily set on the display unit 114. The second reference position P1 can thus be chosen at any point depending on the environment of the position P2 of the base station 140, in order to facilitate the measurement. This can minimize the work steps and efforts required for the measurement and enable more efficient setting of the base station 140.

Furthermore, with the entry of the amounts of offset from the second reference position P1, the position setting system running on the computer 110 automatically calculates the coordinates of the position P2 and registers them in the database unit 130. This lessens mistakes during the work process and enables registration of more precise coordinates of the position P2, as compared with manual entry of the position P2 of the base station 140 as described in the related arts.

Next, a process of confirming the position of the base station 140 is described.

Figure 6:
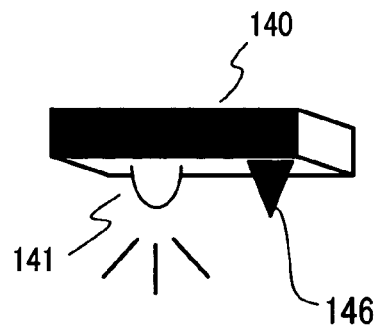
FIG. 6 is a perspective view of a base station attached on a ceiling, with its signal unit being lit according to the embodiment of this invention.

As shown in FIGS. 1 and 5A, the base station 140 has a signal unit 141 on its housing to signal its existence to a manager or an operator. The signal unit 141 performs a predetermined function when an ID (e.g. MAC address) unique to the base station 140 and a predetermined command are transmitted to it. For example, when the signal unit 141 is formed of a light emitting member, the computer 110, for example, can transmit its unique ID and a predetermined command to cause the signal unit 141 to emit light as shown in FIGS. 5A and 6, thereby enabling easy and correct confirmation of the correspondence between the placement and the ID of the equipment.

Figure 4:
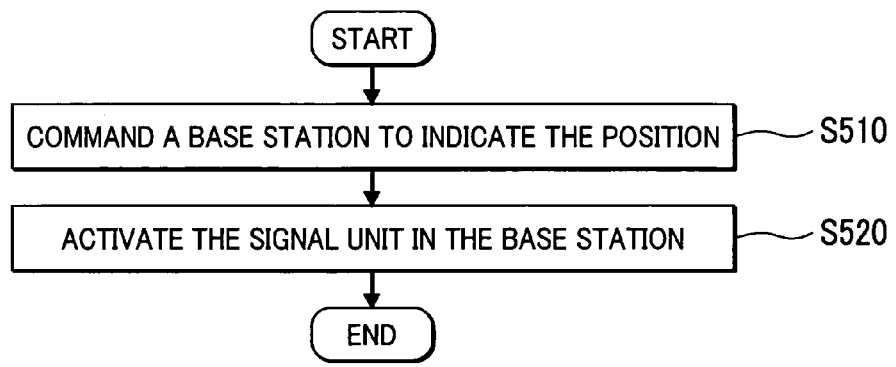
FIG. 4 is a flowchart of an example of a process performed by a computer to confirm the position of the base station according to the embodiment of this invention.

That is to say, in FIG. 1, the computer 110 connected to the base station 140 through the network 150 performs a confirming process as shown in FIG. 4.

In a step S510, the ID (MAC address herein) of the target base station 140 and a command for a predetermined sign are set using, e.g., the keyboard 116, so as to confirm the position of the base station 140.

A step S520 transmits the ID and the command. The base station 140, receiving the ID and command, activates the signal unit 141 to emit light, which allows easy visual recognition of the correspondence between the base station 140 itself and its position.

As mentioned earlier, a plurality of base stations 140 are provided in the same space to measure positions of terminals. In this case, generally, IDs unique to the devices, e.g. MAC addresses, and their locations are associated together in order to recognize individual base stations. Then, since the locations are allotted to the IDs, erroneously installing a wrong station in a position for another station disturbs the designed placement of the base stations, which hinders correct measurement of positions.

Now, such an ID is generally bonded as a label, e.g. on the housing of the base station, so that, when the base station 140 is attached on the ceiling as shown in FIG. 5A, it is often difficult to visually check the ID on the housing. Furthermore, depending on the place where the base station 140 is attached, it may be impossible to visually check the ID. Therefore, in order to recognize individual base stations 140, a conventional method checks whether the base stations are correctly positioned by a process of elimination, or by cutting off the power-supply to a target base station 140 and then transmitting a Ping command or the like to the network to which the base station 140 belongs, so as to determine that the target station has been confirmed when there is no response.

However, this method may fail to correctly recognize the correspondence between individual base stations and their positions because entering a wrong address results in the same situation.

Accordingly, the base station 140 is equipped with the signal unit 141 on the exterior of the housing as shown in FIGS. 1 and 6 and the inspector computer 110 transmits the ID and command as shown in FIG. 4. This causes the signal unit 141 (e.g., light emitting member) of the target base station 140 to individually function (light or blink), making it possible to easily and quickly confirm the correspondence between the base station 140 and its position.

Figure 7:
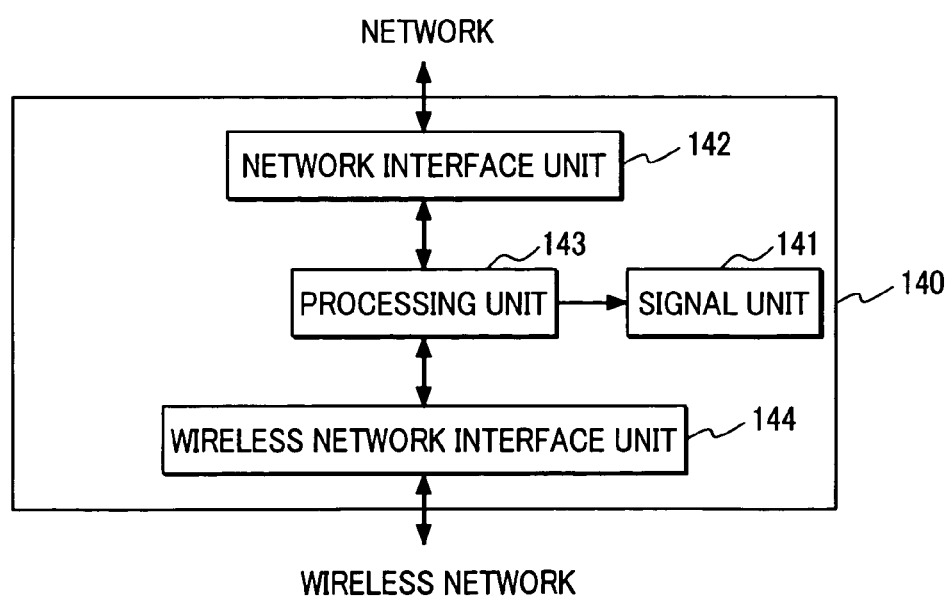
FIG. 7 is a block diagram showing an example of the base station according to the embodiment of this invention.

For this purpose, the base station 140 is constructed as shown in FIG. 7, for example.

The base station 140 includes a network interface unit 142 for connection with the network 150 of FIG. 1, a wireless network interface unit 144 for connection with the wireless network, and a processing unit 143 for processing signals from the interface units 142 and 144.

Figure 8:
FIG. 8 is an explanatory diagram showing an example of a packet transmitted to the base station according to the embodiment of this invention.

The processing unit 143 is configured to activate the signal unit 141 when receiving the predetermined ID (MAC address) of own station and a predetermined command. For example, when the network 150 is an Ethernet (Registered Trademark), the processing unit 143 receives a packet 900 as shown in FIG. 8 which contains the MAC address of own station in a destination address 901 and the predetermined command, for activating the signal unit 141, in a data (control code) 902. Then, the processing unit 143 recognizes that the address extracted from the destination address 901 is its own station ID and the data extracted from the data 902 is the command for activating the signal unit 141, and the processing unit 143 activates the signal unit 141 only when it receives this packet 900.

In this way, the processing unit 143 extracts the address and command from the received signal and drives the signal unit 141 only when the address coincides with its own station ID and the command is a predetermined one. It is thus possible to cause the signal unit 141 of the target base station 140 to perform a given operation in order to confirm the relation between the target base station 140 and its position.

While the example above has shown the signal unit 141 of the base station 140 that is formed of a light emitting member, the signal unit 141 is not limited to a light emitting member but can be formed of any member as long as a manager or an operator can specify individual base stations. For example, the signal unit 141 can be a speaker that generates speech or sound, or the signal unit 141 can be formed of a displaceable member coupled to an actuator.

Also, while the description above has shown an example in which MAC address is adopted as IDs for identifying individual base stations 140, any identifiers can be used as long as they allow identification of individual base stations 140 in the same network. For example, individual base stations may be identified with statically assigned IP addresses, or Universally Unique Identifiers (UUIDs) may be used as device identifiers for identifying individual devices in Universal Plug & Play (UPnP).

Also, the description above has shown an example which separately performs the process, shown in FIG. 2, of calculating and registering the position of the base station 140 and the process, shown in FIG. 4, of confirming the base station 140 and its placement. However, the process of FIG. 4 may continuously follow the process of FIG. 2. In this case, the ID of the base station 140 is set and the second reference position P1 and the amounts of offset are entered, and then the ID and the coordinates of the position P2 of the base station 140 are registered in the database unit 130. Then the signal unit 141 of the registered base station 140 is made to emit light, so as to confirm whether the given base station is installed in the predetermined position. This makes it possible to more efficiently set the base station 140.

Alternatively, the signal unit 141 of the base station 140 may be made to emit light after the coordinates of the position of the base station 140 are obtained in the step S240 of FIG. 2, in order to see whether the base station is set in the correct position. Then, when set correctly, the station is registered in the database unit 130.

Now, the network 150, for example, includes various nodes, such as routers and switches, as well as the base stations 140. Especially, at a data center, for example, where a large number of nodes are stacked in racks, it is not easy to specify machines when a failure occurs in the network.

For example, when communication between certain nodes is disabled due to disconnection or the like, management software can find which node has a failure. Also, the ID (MAC address or IP address) of that node can be known easily.

However, with a conventional node, when the ID label attached on the housing cannot be seen, or when the ID cannot be visually checked, finding the node requires great efforts even if its unique ID is known, since it requires tracing cables to reach the node, for example.

Accordingly, like the base station 140 shown in FIGS. 6 and 7, nodes can be provided with unique IDs and signal units performing a given function when requested by a given command, which considerably enhances network management efficiency.

Figure 9:
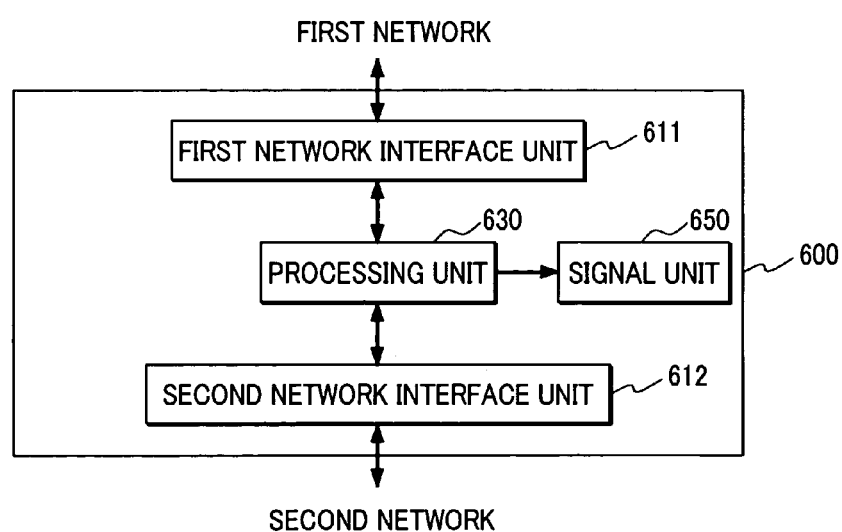
FIG. 9 is a block diagram illustrating an example of a router according to the embodiment of this invention.

For example, FIG. 9 shows an application of this invention to a router.

The router 600 has a first network interface unit 611 connected to a first network, a second network interface unit 612 connected to a second network, and a processing unit 630 for processing signals from these interface units 611 and 612.

The processing unit 630 is constructed to drive a signal unit 650 when receiving the predetermined ID (MAC address or IP address) of own node and a given command.

To know the location of the router 600, a packet 900 containing the ID of the router 600 and a given command, as shown in FIG. 8, is transmitted to drive the signal unit 650 of the router 600, whereby the location of the router 600 can be recognized easily.

Figure 10:
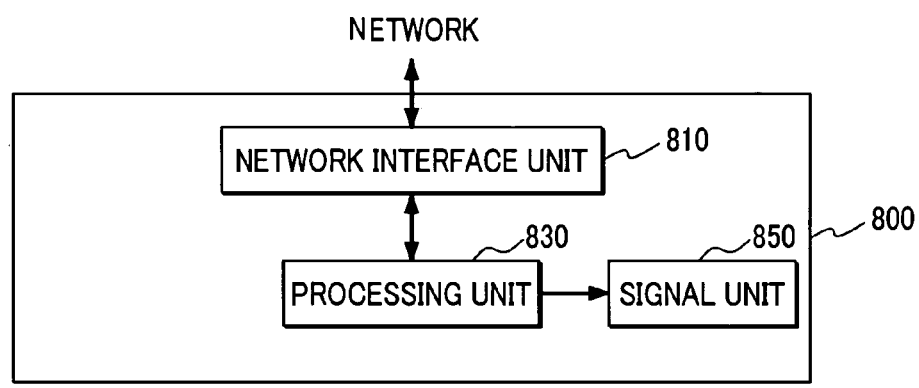
FIG. 10 is a block diagram illustrating an example of a switch according to the embodiment of this invention.

Also, as shown in FIG. 10, this invention can be applied to a switch.

A switch 800 has a network interface unit 810 connected to a network and a processing unit 830 for processing signals from the interface unit 810.

The processing unit 830 is constructed to drive a signal unit 850 when receiving the predetermined ID (MAC address or IP address) of own node and a given command.

To know the location of the switch 800, a packet 900 containing the ID of the switch 800 and a given command, as shown in FIG. 8, is transmitted to drive the signal unit 850 of the switch 800, whereby the location of the switch 800 can be recognized easily.

Figure 11:
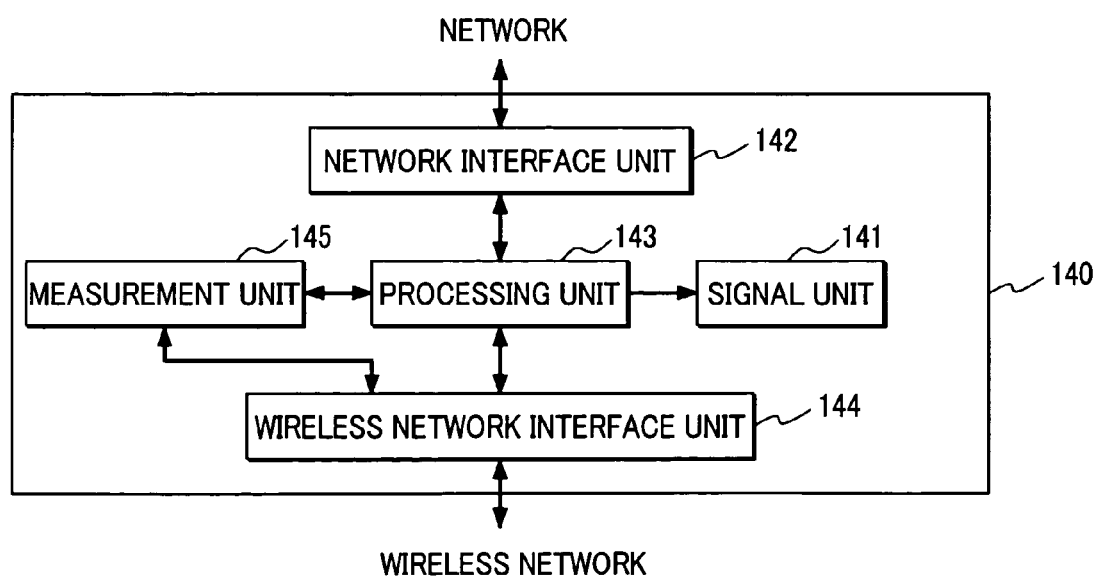
FIG. 11 is a block diagram showing another example of the base station according to the embodiment of this invention.

FIG. 11 shows another embodiment of the base station 140, which additionally includes, in the configuration of FIG. 7, a measuring unit 145 for measuring positions of terminals. This can be used as the base station 140 of FIG. 1.

In the example shown in FIG. 1, the computer 110 has a function as a server for measuring the position of the wireless terminal 170 and a function of setting the position of the base station and registering it in a predetermined database. However, the computer 110 may be provided only with the function of setting and registering the position of the base station in the database, and the database unit 130 may be located not in the computer 110 but in another computer.

Thus, a node, such as the router 600, switch 800, or a base station (access point), has an interface unit for transmitting/receiving signals to and from a network, a processing unit for extracting predetermined values from a signal received at the interface unit, and signal unit for externally signaling its existence when the processing unit extracts the predetermined values.

The processing unit extracts the destination and data from the signal and the signal unit externally signals its existence when that destination is the identifier unique to this node and the data is a predetermined command.

The signal unit includes at least one of a light emitting member, a sound output member, a vibrating member, and a rocking member. Instead of a rocking member, a displaceable member coupled to an actuator may be used to signal the existence.

As described so far, this invention can be applied to the setting and management of base stations to accurately measure the position of terminals in a wireless network, and particularly to a position measuring system using a wireless LAN.

What is claimed is:

1. A method of setting in a database a position of a base station performing wireless communication with a terminal, the method comprising the steps of:
    displaying a map or a drawing including the position of the base station as image information on display unit;
    setting a scale ratio of the image information;
    setting a first reference position using the displayed image information;
    setting, on the display unit, a second reference position from which the position of the base station can be measured;
    setting the position of the base station as an offset measured from the second reference position;
    obtaining real coordinates of the second reference position with respect to the first reference position on the basis of the scale ratio and adding the measured offset to the real coordinates of the second reference position to obtain coordinates of the position of the base station; and
    registering the coordinates of the position of the base station in the database.

2. The base station position setting method according to claim 1, wherein the step of registering in the database registers the coordinates of the position of the base station in combination with an identifier unique to the base station.

3. The base station position setting method according to claim 1, wherein the base station comprises signal unit that indicates its existence when receiving a predetermined signal, and the method transmits the predetermined signal to the base station after obtaining the coordinates of the position of the base station.

4. The base station position setting method according to claim 3, wherein the predetermined signal comprises an identifier unique to the base station and a predetermined command.

5. The base station position setting method according to claim 1, wherein the image information is a previously read map or drawing that includes the position of the base station.

6. A wireless communication system that detects a position of a terminal by transmitting/receiving of a radio signal between a base station and the terminal, the system comprising:
    display unit that displays, as image information, a map or a drawing including a position of the base station;
    reference position setting unit that sets a first reference position using the displayed image information and that sets, on the display unit, a second reference position from which the position of the base station can be measured;
    scale ratio setting unit that sets a scale of the image information;
    coordinate calculating unit that receives the position of the base station as an offset measured from the second reference position, obtains real coordinates of the second reference position with respect to the first reference position on the basis of the scale ratio, and adds the offset to the real coordinates of the second reference position to obtain coordinates of the position of the base station; and
    a database that registers the coordinates of the position of the base station.

7. The wireless communication system according to claim 6, wherein, in the database, the coordinates of the position of the base station is registered in combination with an identifier unique to the base station.

8. The wireless communication system according to claim 6, wherein the base station comprises signaling unit that indicates its existence when receiving a predetermined signal, and the system transmits the predetermined signal to the base station after obtaining the coordinates of the position of the base station.

9. The wireless communication system according to claim 8, wherein the predetermined signal comprises an identifier unique to the base station and a predetermined command.

10. The wireless communication system according to claim 6, further comprising reading unit that previously reads the map or drawing including the position of the base station and generates the image information.

11. A program for setting in a database a position of a base station performing wireless communication with a terminal, the program controlling a computer to execute the processings of:
    displaying a map or a drawing including the position of the base station as image information on display unit;
    setting a scale ratio of the image information;

setting a first reference position using the displayed image information;

setting, on the display unit, a second reference position from which the position of the base station can be measured;

setting the position of the base station as an offset measured from the second reference position;

obtaining real coordinates of the second reference position with respect to the first reference position on the basis of the scale ratio and adding the measured offset to the real coordinates of the second reference position to obtain coordinates of the position of the base station; and registering the coordinates of the position of the base station in the database.

12. The program according to claim 11, wherein the processing of registering in the database registers the coordinates of the position of the base station in combination with an identifier unique to the base station.

13. The program according to claim 11, wherein the base station comprises signaling means that indicates its existence when receiving a predetermined signal, and the program comprises a processing of transmitting the predetermined signal to the base station after obtaining the coordinates of the position of the base station.

14. The program according to claim 13, wherein the predetermined signal comprises an identifier unique to the base station and a predetermined command.

15. The wireless communication system according to claim 11, further comprising a processing of previously reading the map or drawing including the position of the base station and generating the image information.

* * * * *